Nov. 13, 1923.         1,473,938
W. R. ROYER
VALVE PROTECTING AND OPERATING DEVICE FOR PNEUMATIC TIRES
Original Filed May 21, 1920
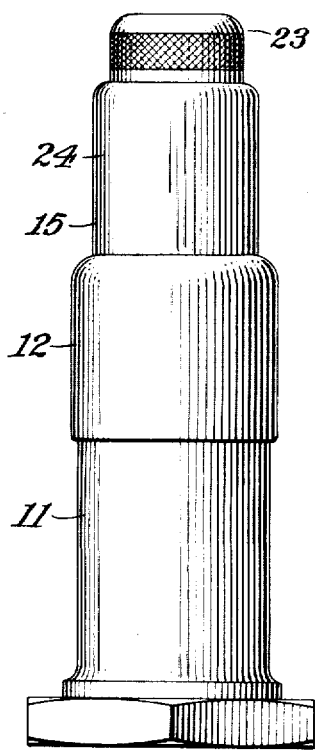
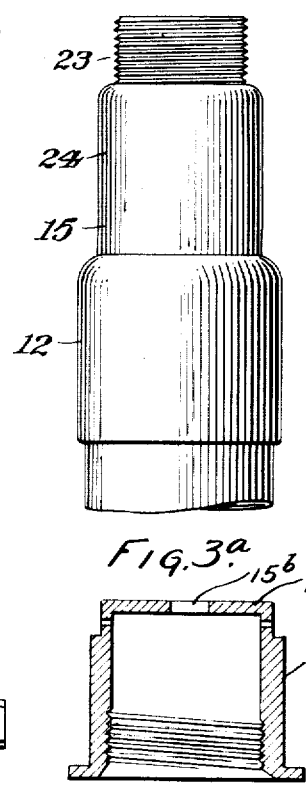
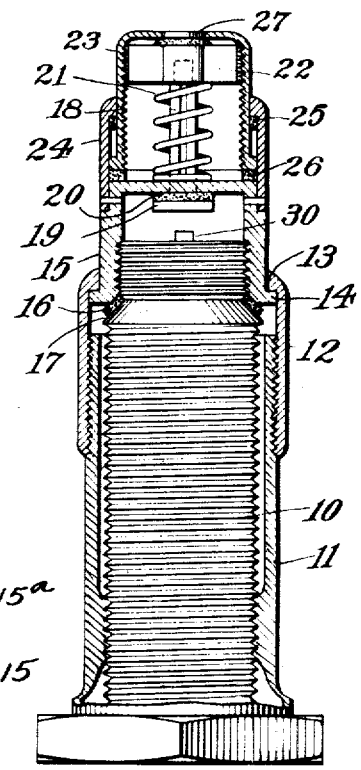
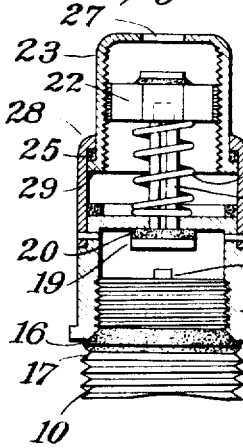
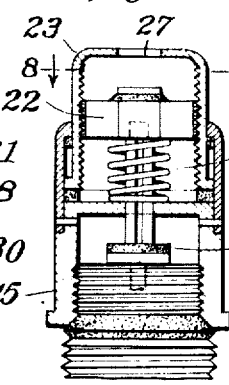
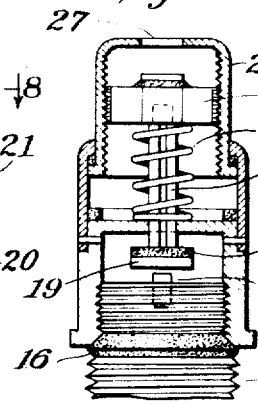
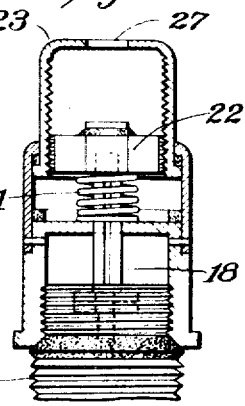
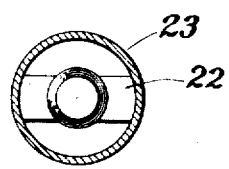
INVENTOR
William R. Royer
BY
Kerr, Page, Cooper & Hayward
ATTORNEYS Patented Nov. 13, 1923.

1,473,938

UNITED STATES PATENT OFFICE.

WILLIAM R. ROYER, OF WILKES-BARRE, PENNSYLVANIA.

VALVE PROTECTING AND OPERATING DEVICE FOR PNEUMATIC TIRES.

Application filed May 21, 1920, Serial No. 383,119. Renewed February 21, 1923.

*To all whom it may concern:*

Be it known that I, WILLIAM R. ROYER, a citizen of the United States of America, residing at Wilkes-Barre, in the county of Luzerne and State of Pennsylvania, have invented certain new and useful Improvements in Valve Protecting and Operating Devices for Pneumatic Tires, of which the following is a full, clear, and exact description.

In pneumatic tires it is customary to cover the valve stem (extending through the felloe) with a dust cap screwed on the stem to protect the valve mechanism from injury, but such caps are often lost, or the user forgets to replace them after removal for inflating the tires, with the result that the next time the tire is inflated the valve plunger fails to seat properly and the air leaks slowly away. The present invention is designed to obviate such trouble, and accordingly its chief object is to provide a cap which need not be removed to permit inflation of the tire but which nevertheless can be readily taken off for inspection or repair of the valve parts. To these and other ends the invention consists in the novel features and combinations hereinafter described.

One form of the invention is illustrated in the accompanying drawing, in which—

Fig. 1 is a side view of the complete device in normal or closed position.

Fig. 2 is a detail side view of the upper portion of the device, showing the depressible member threaded outside to accommodate a protecting cap if desired, or to receive the threaded coupling of an air-hose.

Fig. 3 is a longitudinal section of the complete device in normal or closed position.

Fig. 3ª is a detail sectional view of one of the parts shown in Fig. 3.

Figs. 4, 5, 6 and 7 are detail sectional views, on the same plane as Fig. 3, showing various positions of the depressible valve-actuating member.

Fig. 8 is a sectional plan view on line 8—8 of Fig. 5.

In the construction shown, the threaded valve stem 10 is covered by an outer tubular casing composed of a lower part 11 and an upper part 12, threaded together so that the casing can be lengthened or shortened to fit valve stems of different lengths. The lower member 11 screws on the stem, as indicated. The upper member has at its top a flange 13 cooperating with a flange 14 on the tubular member or extension 15 which is screwed on the top of the valve stem and presses firmly upon a yielding gasket 16 seated on the valve stem shoulder 17. When the collar 12 is screwed down it has the effect of a lock-nut, holding the part 15 against accidental loosening as will be readily understood, but when the collar is removed the part 15 can be unscrewed to give access to the valve parts for examination and replacement.

The extension 15 is in the form of an inverted cup, having in its top 15ª an angular opening 15ᵇ constituting an air port and adapted to receive and hold against rotation an angular stem or rod 18, which may, however, be moved longitudinally in said opening. The stem is fluted to permit the flow of air into and out of the cup. At its lower end it has a small valve head 19 covered by a yielding washer 20 so that when the stem is raised by its spring 21, as in Fig. 3, a tight joint will be made around the opening through which the stem extends. The upper head 22, rigidly fixed on the stem, is a transversely elongated member having its ends threaded to cooperate with threads cut on the inside of a cap 23 which is adapted to slide inside of a collar 24 screwed on or otherwise secured to the top of the cup 15, the collar and cup forming together a tubular member having between its inner and outer ends a transverse septum 15ª provided with an opening 15ᵇ (through which the rod or stem 18 works) constituting an air port. As shown, the inner end of the tubular member is threaded, to screw down upon the valve stem 10. Between the cap and the collar is a yielding washer 25, and under the cap is yielding washer 26.

In the position shown in Fig. 3 the cap 23 is screwed down firmly upon the gasket 26, bringing the opening 27 into engagement with the bevelled top of the head 22 and effectually closing said opening against admission of dust or other foreign matter.

When it is desired to inflate or deflate the tire (not shown) the cap 23 is rotated counterclockwise, that is, unscrewed. Since the rod 18 cannot rotate, and since it cannot rise by reason of the lower head 19, the cap alone is raised, say to the position shown in Fig. 4, in which the washer 25 is compressed between the collar-flange 28 and the cap-flange 29. If now the usual connecting fitting (not shown) on the air-hose is pressed down upon the cap the latter will be depressed, say to the position shown in Fig. 5, in which the head 19 has engaged and depressed the valve plunger 30, Figs. 3 and 4, thereby opening the valve for the admission of air. Upon removing the air-hose the spring 21 raises the stem 18 (and with it the cap 23), thereby permitting the valve plunger to seat again. To deflate the tire the cap is unscrewed to the position shown in Fig. 4 and the rotation continued. Since the cap can no longer rise, the stem or rod 18 must descend, finally reaching the position shown in Fig. 7, in which the air-valve plunger is fully depressed and held, thus keeping the air-valve open until the cap is screwed down again.

In inflating the tire with a single acting or an intermittently operating pump, the air-valve should close after each stroke of the piston to prevent escape of the air previously forced into the tire. With such a pump the cap 23 is raised about to the position shown in Fig. 6, where it will be seen that the stem 18 is depressed (by unscrewing the cap) till its head is slightly above the valve plunger 30. The pump hose is now screwed to the cap. Then on the compression stroke of the pump the air under pressure flows down along stem 18 into the cup or chamber 15, and the air-valve is opened by the pressure of the air; but on the suction stroke the plunger 30, not being held down, can rise and close the valve against escape of air.

To close the device after use, the cap 23 is simply screwed down to its normal position, as in Fig. 3. This raises the stem or rod 18 and brings the washer 20 up firmly on the aperture through which the stem works, thereby closing the same and effectually preventing the escape of air or ingress of foreign matter. At the same time the upper head 22 is seated in the opening 27, thus preventing admission of grit, water, or the like and completely protecting the enclosed parts.

From the foregoing it will be seen that my invention provides a dust-cap which effectively protects the valve, and yet without removal permits opening of the valve to any desired extent for inflation or deflation. It also is readily removable, by unscrewing the collar 12 and chamber 15, whenever necessary to examine or renew the "valve insides."

It is to be understood that the invention is not limited to the specific construction herein illustrated and described but can be embodied in other forms without departure from its spirit.

I claim as my invention:

1. The combination with the valve stem of a pneumatic tire, having an air-valve plunger, of a hollow member mounted over said stem, a non-rotatable stem shiftable through said member to actuate said plunger, an axially shiftable cap to actuate said shiftable stem, having screw-thread connection with the latter and provided wth an air opening, and means carried by the shiftable stem to close said air opening when the cap is screwed down.

2. The combination with the valve stem of a pneumatic tire, having an air-valve plunger, of an inverted cup mounted on the valve stem, a plunger-operating stem slidable in the top of the cup to depress the air-valve plunger, and manual means for locking said plunger-operating stem in inoperative position or releasing it, at will.

3. The combination with the valve stem of a pneumatic tire, having an air-valve plunger of an inverted cup mounted on the valve stem, a non-rotatable plunger-operating stem slidable through the top of the cup to depress the air-valve plunger, and a rotatable cap having screw-thread connection with the plunger-operating stem to shift the same longitudinally.

4. A device for the purpose described, comprising in combination, a chamber open at the bottom and adapted for attachment to a valve stem, a non-rotatable plunger-operating stem slidable through the top of the chamber, a rotatable and longitudinally movable cap arranged over the valve-operating stem outside of said chamber, a head on the valve-operating stem having threaded connection with the cap, and a spring adapted to raise said cap and stem.

5. A device for the purpose described, comprising in combination, a chamber adapted for securement on a valve stem, a non-rotatable plunger-operating stem slidable through the top of said chamber, an apertured internally threaded cap arranged on said chamber and enclosing the outer portion of said stem, a collar cooperating with said cap to retain the same in place but permitting rotary and longitudinal movement thereof, a threaded head on the plunger-operating stem engaging the threads in said cap, said head also being adapted to close the aperture in the cap when the latter is screwed down on the head, and a spring for raising the cap and stem as the former is unscrewed.

6. The combination with a pneumatic tire valve-stem having an air-valve plunger; of means seated over the end of the valve-stem for operating the air-valve plunger, said means comprising a longitudinally shiftable rod in alignment with the plunger; and a longitudinally shiftable casing arranged over the valve-stem and having screw-threaded connection with the shiftable rod to prevent accidental movement of the latter.

7. In a device for the purpose described, the combination with a pneumatic tire valve-stem having a valve plunger, of a cap seated on the end of the valve-stem, a rod movable longitudinally through the outer end of the cap to depress the said valve plunger; a spring normally holding the said rod in raised position; a second cap associated with the first and adjustable relatively thereto to depress said rod and thereby depress the said valve plunger, said second cap enclosing the rod and spring and having an airport; and a closure for said airport shiftable out of the port to open the same by movement of the second named cap.

8. The combination with a pneumatic tire valve stem having an air valve plunger; of a tubular member screwed down on the end of the valve and hermetically sealed thereto, and having between its ends a transverse septum provided with an air port for the flow of air to and from the valve stem; a non-rotatable rod shiftable longitudinally of the tubular member for operating the air valve plunger and having an inner valve-head to cooperate with said air port; an inverted rotatable cup shiftable longitudinally in the outer portion of the tubular member and having an air port in line with said rod; an outer head on the rod to cooperate with the last mentioned air port and having screw-threaded connection with said cup, whereby said rod may be shifted longitudinally in both directions by rotation of the cup; and a spring between the outer head and said septum to urge the rod and cup outwardly.

9. The combination with a pneumatic tire valve stem having an air valve plunger; of a tubular member screwed down on the valve stem and hermetically sealed thereto, and having an air port between its ends; a non-rotatable rod shiftable longitudinally within said tubular member to depress the air valve plunger; a valve head associated with said rod to close and open said air port as the rod is shifted; an inverted rotatable cup fitted to the outer portion of the tubular member and shiftable longitudinally thereof; and means associated with the rod and having screw thread connection with the cup, whereby rotation of the cup in one direction will draw the rod outwardly and seat the valve head firmly and rotation in the opposite direction will permit inward movement of the rod to open said air port.

10. The combination with a pneumatic tire valve stem; of a tubular member screwed down upon the valve stem and hermetically sealed thereto, and having an air port between its ends; a valve head cooperating with said port to close and open the same; a longitudinally shiftable rod connected with the valve head to actuate the same; a spring associated with the rod to urge the same and the valve head outwardly to seat the valve head yieldingly; and manually rotatable means having screw-thread connection with the rod to urge the same positively outward and hold the same in outer position with the valve head seated firmly.

11. The combination with a pneumatic tire valve stem having an air valve plunger; of a tubular member mounted on the valve stem and having an air port between its ends; a longitudinally shiftable rod to actuate said plunger, having a head on its outer end and having on its inner end a valve-head cooperating with said air port to close and open the same; a spring in the outer portion of the tubular member, between the air port and the outer head on the rod, to urge the rod outwardly and seat the valve head yieldingly; and manually rotatable means adapted to releasably hold the rod in its outer position with the valve head seated positively.

12. An appliance for the valve stem of a pneumatic tire, comprising, in combination, a tubular member internally threaded at one end to screw down upon the valve stem and having an air port between its ends; a rod shiftable longitudinally in the outer portion of the tubular member and having on its inner end a valve head to cooperate with said air port; a spring in the outer portion of the tubular member to urge the rod outwardly and seat the valve head yieldingly; and manually rotatable means associated with the rod to positively urge the same outwardly and seat the valve head firmly against accidental displacement.

13. An appliance for the valve stem of a pneumatic tire, comprising, in combination, a tubular member having one end threaded inside to screw down upon the valve stem, and having an air port between its ends; a valve-head cooperating with the air port to close and open the same; a longitudinally shiftable rod connected with the valve head to actuate the same; a spring associated with the rod to urge the same outwardly and seat the valve head yieldingly; and means for positively urging the valve head and rod outwardly to seat the former firmly against accidental displacement, said means including an operating member fitted in the outer end of the said tubular member and manually rotatable therein.

14. An appliance for the valve stem of a pneumatic tire, comprising, in combination, a tubular member threaded internally at one end to screw down upon the valve stem, and having an air port between its ends; a valve-head cooperating with the air port to close and open the same; a longitudinally shiftable rod associated with the valve head to actuate the same; a spring acting to urge the rod and the valve head yieldingly outward to close the air port; a longitudinally shiftable non-rotatable member connected with the valve head and rod to urge the valve head positively outward and hold the same firmly seated; and a manually operable member fitted in the outer end of the tubular member and connected with the longitudinally shiftable member to actuate the latter.

In testimony whereof I hereto affix my signature.

WILLIAM R. ROYER.